No. 745,116. PATENTED NOV. 24, 1903.
C. PETERSEN.
AUTOMATIC CORN FEEDER AND REGULATOR FOR CORN SHELLING MACHINES.
APPLICATION FILED NOV. 22, 1902.
NO MODEL. 2 SHEETS—SHEET 1.
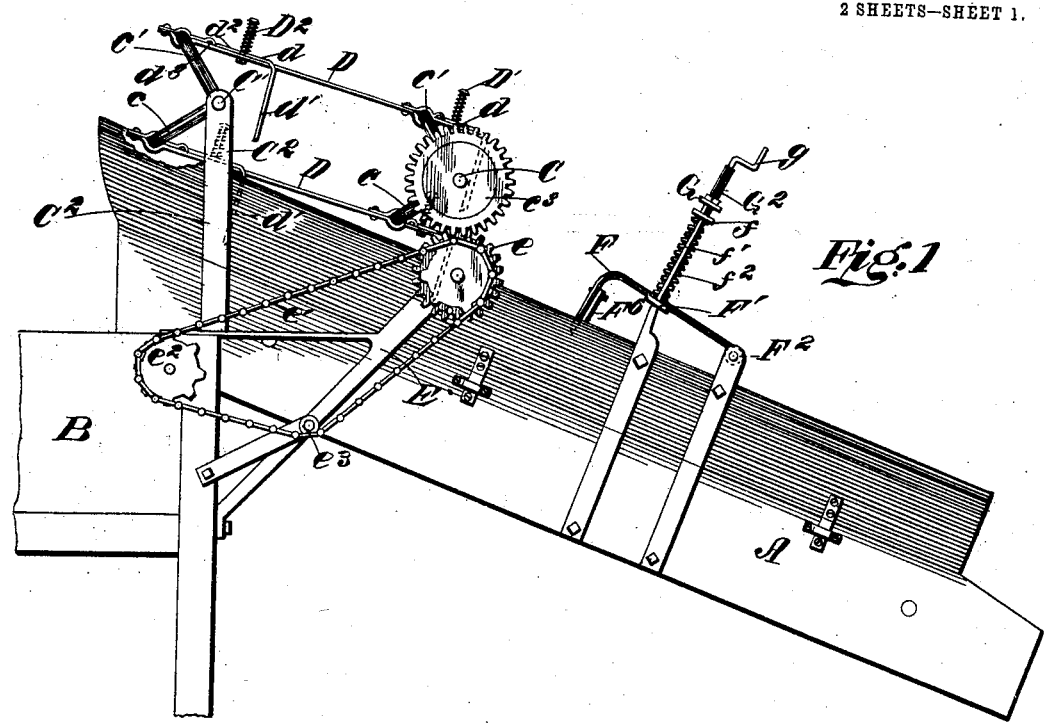
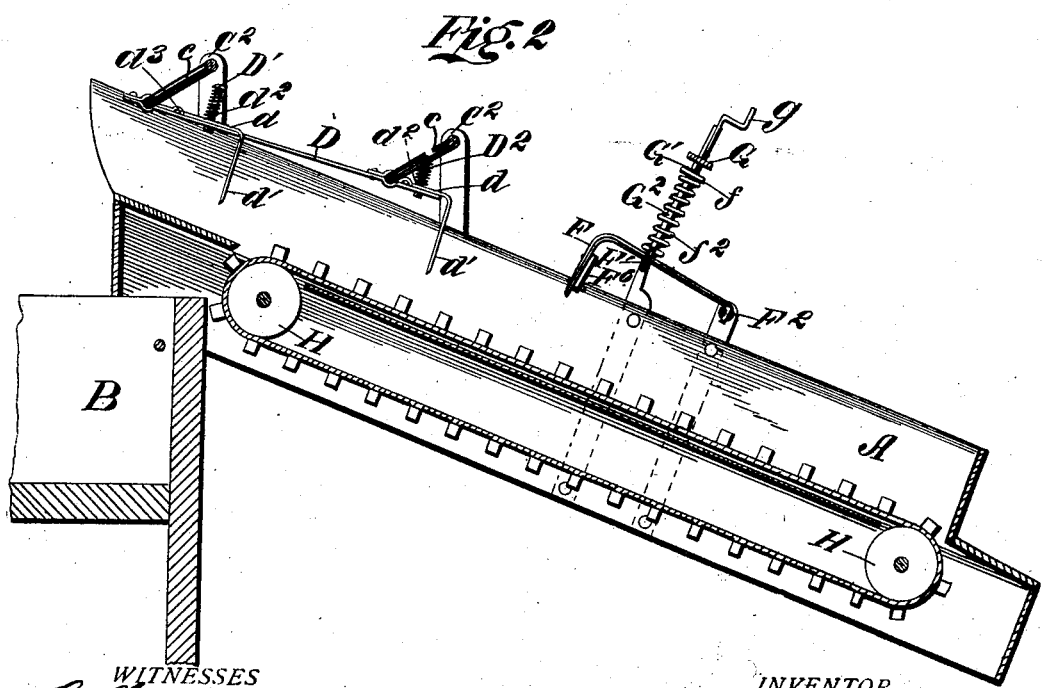
WITNESSES
INVENTOR
Christ Petersen
By Alexander Howell
Attorneys.

No. 745,116. PATENTED NOV. 24, 1903.
C. PETERSEN.
AUTOMATIC CORN FEEDER AND REGULATOR FOR CORN SHELLING MACHINES.
APPLICATION FILED NOV. 22, 1902.
NO MODEL. 2 SHEETS—SHEET 2.
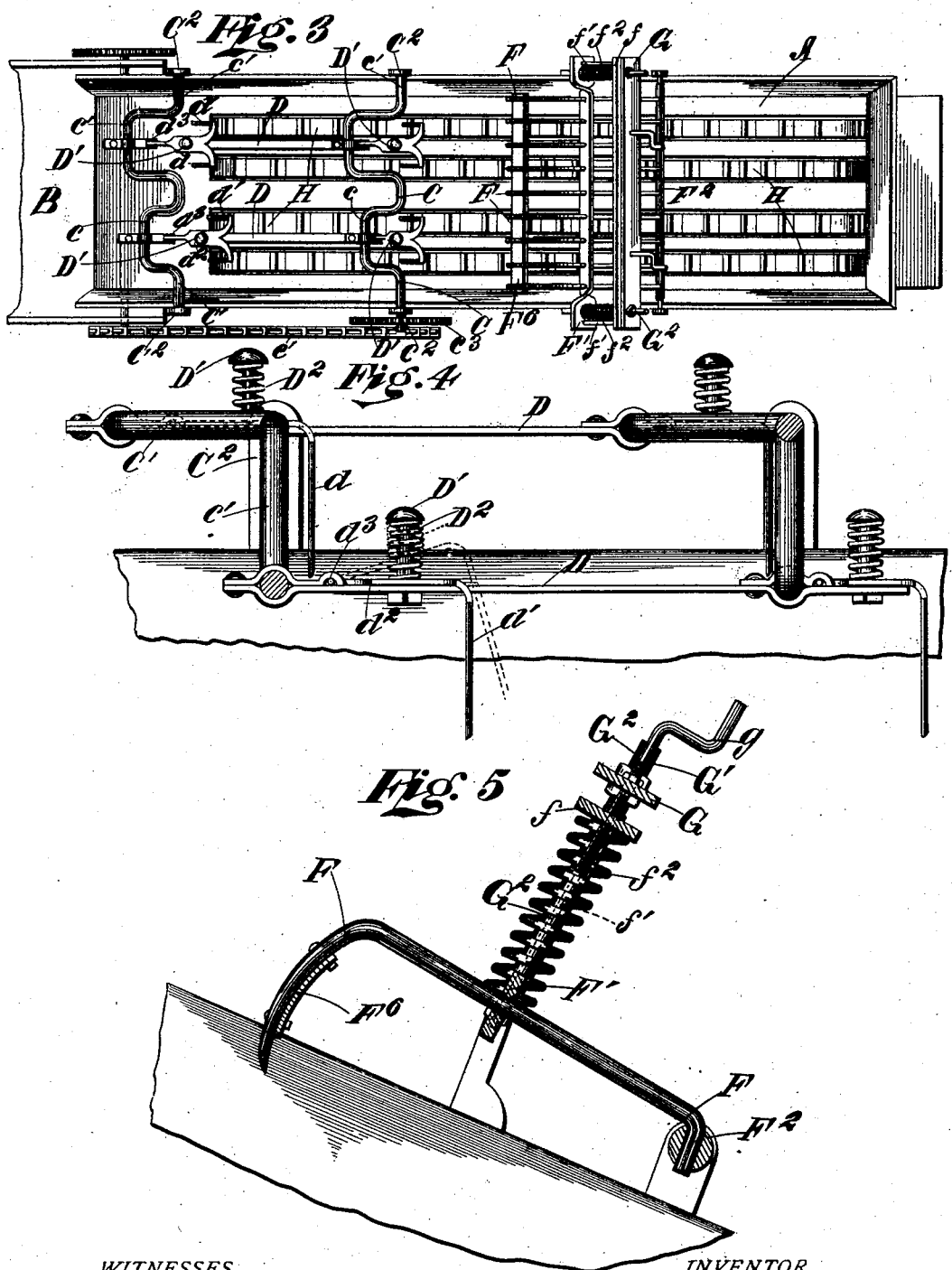

No. 745,116.

Patented November 24, 1903.

UNITED STATES PATENT OFFICE.

CHRIST PETERSEN, OF MINDEN, IOWA.

AUTOMATIC CORN-FEEDER AND REGULATOR FOR CORN-SHELLING MACHINES.

SPECIFICATION forming part of Letters Patent No. 745,116, dated November 24, 1903.

Application filed November 22, 1902. Serial No. 132,401. (No model.)

*To all whom it may concern:*

Be it known that I, CHRIST PETERSEN, of Minden, in the county of Pottawattamie and State of Iowa, have invented certain new and useful Improvements in Automatic Corn-Feeders and Regulators for Corn-Shelling Machines; and I hereby declare that the following is a full, clear, and exact description thereof, reference being had to the accompanying drawings, which form part of this specification.

This invention is an automatic feeder and regulator for corn-shelling machines, for which it is especially designed; but it is also useful in connection with cutting and threshing machines of various kinds.

The object of the invention is to provide an improved rake feeder and also to provide an improved evener for regulating the thickness of the layer of material fed to the machine.

The novel features and combinations of parts constituting this invention and for which protection is desired are summarized in the claims, and the accompanying drawings illustrate an apparatus embodying the several features of the invention and which will now be described in detail with reference thereto.

In said drawings, Figure 1 is a side elevation of the feeder and regulator as attached to the feed-box of a machine. Fig. 2 is a longitudinal section therethrough. Fig. 3 is a top plan view. Fig. 4 is an enlarged view of one of the spring-controlled forks, and Fig. 5 is an enlarged section view of the regulator.

In said drawings, A represents the feeder and regulator of the machine, in which the corn, &c., is placed and through which it is fed forward to the shelling, cutting, or threshing devices of a machine B, to which the feeder is attached. The shelling, cutting, or threshing mechanism forms no part of the present invention, and therefore is not illustrated herein.

The feeding devices forming part of the present invention comprise two crank-shafts C C', lying transversely of the feed-box and suitably journaled in uprights $C^2$ on the sides thereof. Each shaft is shown as provided with two cranks $c\ c'$, set at an angle, preferably, of ninety degrees. The similar cranks $c\ c$ and $c'\ c'$ of the two shafts are connected together by bars D, which are journaled on said cranks, and as the shafts rotate these bars D will have a longitudinal gyratory motion imparted to them. Upon these bars D are mounted a series of forks $d$, each of which has two prongs $d'$ depending on opposite sides of the bar, while the fork-tang $d^2$ is bent at right angles to the forks and lies normally upon the top of the bar and is pivoted thereto, as at $d^3$, so that the forks may rise and fall on the bar, but are normally held down by means of a spring $D^2$ on a bolt $D'$, connected to the bar D and extended through a slot in the tang of the fork, the spring $D^2$ being interposed between the fork and the head of the bolt. Two or more of these forks may be attached to each bar D, as shown in the drawings.

On one end of the shaft C is a pinion $c^3$, which meshes with a pinion $e$, journaled on a bracket E, attached to the machine B, pinion $e$ being driven by a sprocket-chain $e'$ from a sprocket $e^2$ on one of the shafts of the machine, as indicated in the drawings, and the slack in chain may be taken up by a roller $e^3$, as indicated in Fig. 1.

The shafts C C' will be rotated in such direction that the forks $d'$ will move down into the corn or material in the box and move it on toward the machine and then rise out of the corn, move back, and then again descend, thus effectually feeding the corn forward in the box and insuring an even supply to the shelling or other machine. It is desirable in a machine of this class to regulate the depth of the layer of corn or other material passing forward to the machine, and for this purpose I provide the feed-regulator shown, which comprises a series of bell-shaped fingers F, the vertical portions of which depend into the feed-box and the horizontal portions thereof pass through a supporting-rod F' and are pivotally connected to a transverse bar or rod $F^2$, arranged across the feed-box. The bar F' is vertically adjustable, so that it can simultaneously raise or lower all the fingers F. (See Fig. 5.) For this purpose the ends of the bar F' are connected by rods $f'$ to a vertically-adjustable plate $f$, which is supported by screw-rods G' engaging plate $f$ and passing upward through a top plate G, which is fixedly supported on rods $G^2$, attached to the sides of the feed-box A, as shown. The screws G' are provided with handles $g$, by which they can be rotated, and thus raise or lower the plate $f$. Springs $f^2$ are strung on rods $G^2$ between the bars $f'$ and plate $f$ and normally hold the bar F' down relatively to plate $f$ with the fingers F in the position to which they have have been adjusted by the rods G'; but these springs $f^2$ allow the bar F' to rise or yield, if necessary, to prevent the breaking of the fingers if for any reason any unyielding objects pass thereunder. It is customary in these feed-boxes to employ endless carrier belts or chains in the bottoms thereof to facilitate the feeding of the material. Such devices may be used in connection with the present invention and are indicated at H H; but they do not form any part of my invention, and I have not deemed it necessary to particularly illustrate them.

When used in connection with corn-shelling machines, for example, the corn is fed into the box below the regulator and moved forward by the carrier belts or chains under the fingers F, which regulate the depth of the layer of corn passing onward to the shelling mechanism. After passing the regulators the feeding-forks act upon the layer of material and assist the belt in feeding it forward with certainty, so that the shelling mechanism will be properly supplied with a substantially uniform amount of corn, so that the machine can act efficiently. The forks force the corn into the grip or embrace of the shellers, so that it cannot recoil or escape therefrom and clog up at the top of the feed-box, as it would do if merely fed forward by the belts. Obviously the invention is applicable to other kinds of machines and to feed other kinds of materials, and I therefore do not restrict myself to its use in connection with corn-shellers.

In some instances it is desirable to attach a shield-plate $F^6$ to the regulator-hooks, as indicated in the drawings, to prevent them becoming clogged if the feed to the regulator is too rapid. This plate extends across the line of hooks, but does not extend to the points of the teeth, which project below it and perform their desired function of regulating the feed.

Having thus described my invention, what I therefore claim as new, and desire to secure by Letters Patent thereon, is—

1. In a rake feeder, the combination of the box, adjacent crank-shafts arranged transversely thereof and supported above the box, parallel bars supported on the similar cranks of adjacent shafts, a series of bifurcated forks having tangs bent at right angles and pivoted to said bars, bolts attached to the bars and passing through slots in the tangs of the forks, and springs interposed between the head of the bolt and the forks, all adapted to operate substantially as described.

2. A regulator for feed-boxes, comprising a fixed bar extending across the box, a plate adjustably suspended from said bar, a finger-supporting bar suspended from said plate, springs interposed between the plate and finger-bar, and a series of L-shaped fingers having their forward ends supported by said bar and their rear ends connected to a fixed support with a carrier for moving material forward in the box and beneath said fingers, all adapted to operate substantially as described.

3. In a rake feeder, the combination of the feed-box, the crank-shafts arranged thereon, the bars connected with the cranks of the shaft, and bent forks pivoted on and depending below such bars, and springs connected with the bars and pressing upon the forks to hold the latter yieldingly down on the bars, substantially as described.

4. In a rake feeder, the combination of the feed-box, the crank-shafts arranged transversely thereof, the bars connected to similar cranks of the shafts, a plurality of forks having tangs pivoted to the bars and bifurcated ends extending below the bars and springs engaging the tangs of the forks, for holding said forks yieldingly in position, substantially as described.

5. In a rake feeder, the combination of the box, a pair of adjacent crank-shafts arranged transversely thereof, bars connected to similar cranks of adjacent shafts; a series of forks pivoted to said bars, bolts attached to the bars and passing through slots in the forks, and springs interposed between the heads of the bolts and the forks for normally depressing the latter, all adapted to operate substantially as described.

6. In a feed-box regulator, the combination of a series of movable fingers extending across the box, a bar supporting the fingers, means for vertically adjusting said bar, springs for yieldingly holding said bar down and a carrier for moving material beneath the fingers, substantially as described.

7. In a regulator for feed-boxes, the combination of the box, a fixed bar extending thereacross, a plate adjustably suspended from said bar, a finger-supporting bar suspended from said plate, springs interposed between the plate and finger-bar and a series of fingers supported by said bar with a carrier for moving material forward in the box and beneath said fingers, substantially as described.

8. In combination a feed-box, a bar extending across the box, a series of vertically-adjustable spring-pressed fingers, attached to said bar, and a plate extending across the fingers, for regulating the position thereof, with a carrier for moving material forward in the box and beneath said fingers.

9. In a feed-box the combination of a series of fingers, a bar supporting them and extending across the box, means for vertically adjusting said bar, springs for yieldingly holding said bar down, and a plate extending across the series of fingers above the points
5 to prevent choking thereof, with a carrier for moving material forward in the box and beneath said fingers.

In testimony that I claim the foregoing as my own I affix my signature in presence of two witnesses.

CHRIST PETERSEN.

In presence of—
PETER JACOBS,
G. H. MUHLSTEIN.